UNITED STATES PATENT OFFICE.

ERNST EISENGRÄBER, OF FRANKFORT-ON-THE-MAIN, GERMANY.

WELDING-POWDER FOR WELDING IRON AND STEEL.

1,091,312. Specification of Letters Patent. Patented Mar. 24, 1914.

No Drawing. Application filed August 7, 1913. Serial No. 783,603.

*To all whom it may concern:*

Be it known that I, ERNST EISENGRÄBER, a subject of the German Emperor, and resident of Frankfort-on-the-Main, Germany, have invented certain new and useful Improvements in Welding-Powders for Welding Iron and Steel, of which the following is a specification.

The present invention relates to a welding powder for welding steel and iron, composed of red hematite mixed with a small amount of pulverized coal and a still smaller amount of pulverized flux.

The use of charcoal as a reducing substance in welding powders is known; but charcoal is not as good as coal in welding powders, because when the temperature rises above 1000 degrees Celsius, charcoal causes the cementation of soft steel and iron, that is to say carbon becomes combined with the same, which makes the products unfit for welding. When the temperature is below 1000 degrees, for instance when welding harder steels, carbon does not act with the same energy as a reducing agent as carbon monoxid evolved from the pulverized coal together with the accessory products hydrogen and methane. But when the temperatures are higher than 1000 degrees, which occur when welding iron and soft steel, any danger of cementation of the welding parts is excluded when making use of pulverized coal.

Iron ore, for instance red hematite, forms a slag producing substance; the lime of same combines with the sulfur of the used coal and the calcium sulfite (CaS) is removed with the slag. The remaining contents of the red iron ore (forming slag), such as silicic acid, clay, manganous oxid, lime, magnesium oxid and the like, provide over the already proposed pure oxid of iron the advantage of a greater protection against oxiding effects. Furthermore in a combination of the kind described, which may be considered as an alloy, the melting point is greatly reduced so that the slag flows more readily.

Instead of red hematite, reduced red hematite may be conveniently used, because it flows more readily.

The used flux is phosphate of sodium, which favors the production of slag. Instead of phosphate of sodium different known fluxes may be used, for instance fluor spar, cryolite, carnalite and the like.

The normal composition of the welding powder is the following:

Red hematite ___70 parts by weight.
Coal _____22 " " "
Flux _____ 8 " " "

Of course the proportion of each of said elements may slightly be varied according to the nature of metal or alloy to be welded.

The welding powder according to the above invention is very convenient for welding soft and hard steel and for welding different kinds of steel and iron because it may be used for high and low welding temperatures.

Having now fully described my said invention, what I claim and desire to secure by Letters Patent, is:

1. Powder for welding iron and steel consisting of pulverized red hematite ore, pulverized coal, and pulverized flux, the proportion of pulverized flux being less than the proportion of pulverized coal.

2. Powder for welding iron and steel consisting of seventy parts of red hematite ore, twenty-two parts of pulverized coal, and eight parts of pulverized flux.

In testimony whereof I have hereunto set my hand in presence of two witnesses:

ERNST EISENGRÄBER.

Witnesses:
  WILHELM WÖRN,
  HEINRICH RÖDELBROUSE.